United States Patent Office 2,748,085
Patented May 29, 1956

2,748,085
PROCESS FOR INHIBITING FOAM

Louis T. Monson, Puente, Calif., assignor to Petrolite Corporation, a corporation of Delaware No Drawing. Application December 18, 1951,
Serial No. 262,326

8 Claims. (Cl. 252—321)

This invention relates to a process for reducing or destroying foam or inhibiting its formation, in compositions of either aqueous or non-aqueous nature.

Foams occur as undesirable, incidental features in many industrial processes. The theory of their formation is not highly developed; so that hypotheses on which foam reduction or destruction processes might be based are difficult to formulate. As a consequence, foam-destroying agents are usually devised for use in the case of particular foams.

I have discovered a novel process of reducing or destroying foams and of preventing their formation, which appears to be relatively general in applicability, in that it may be used on compositions comprising aqueous materials, or solutions; on compositions comprising non-aqueous materials, such as hydrocarbon liquids; and on compositions comprising mixtures of aqueous and non-aqueous media. My process consists in subjecting a foaming or potentially-foaming composition to the action of a small proportion of a reagent or anti-foamer of the kind subsequently described, thereby causing the foaming properties of the liquid to be diminished, suppressed or destroyed. In applying my process to the reduction or destruction of a foam, the reagent may be poured or sprayed or dripped into the body of foam on top the liquid, as desired; and the foam breaks and is destroyed or reduced, substantially at once, as a consequence of such addition of said reagent. Adding the reagent to the liquid underlying such already-formed foam is also practicable. In applying my process to the prevention of foaming, the reagent is admixed, in some small proportion, with a potentially-foaming liquid, by any desired or suitable procedure. The ability of the system to foam is destroyed or at least materially reduced by such addition of said reagent.

The reagents employed as the foam inhibitors or antifoamers in my process are oxyalkylated derivatives of surface-active, heat-polymerized aminoalcohols, which parent materials, in monomeric form, are secondary or tertiary amines containing at least two alkanol or hydroxyalkyl radicals.

Such parent compounds may be obtained by the polymerization of triethanolamine, tripropanolamine, etc., by the elimination of water and the production of ether linkages. Such polymers are characterized by showing surface-activity. This means their dilute solutions have the ability to foam, to reduce the surface tension of water, to act as emulsifiers, etc. Their exact composition cannot be depicted by the usual chemical formulas because their structures may be cyclic or acyclic or both, and are subject to wide variations. The primary reaction in their production is undoubtedly etherization, although if some secondary amine, e. g., diethanolamine or dipropanolamine, is present, it is possible that water may be eliminated in some reaction other than etherization, with the result that two nitrogen atoms are united by an alkylene radical, as distinguished from an alkylene-oxyalkylene radical.

Even though the exact structure of such parent surface-active, heat-polymerized alkanolamines is not fully understood, there is no difficulty or novelty in their manufacture, and they have been used commercially for various purposes. The alkanolamines herein included as raw materials or reactants for polymerization are prepared commercially by the reaction of ammonia and an alkylene oxide, usually ethylene oxide or propylene oxide. If two moles of alkylene oxide are used per mol of ammonia, a dialkanolamine is produced; if three moles of oxide are used, a trialkanolamine is produced. If more than three moles of alkylene oxide are employed per mol of ammonia, in this synthesis, ether-aminoalcohols are produced; and these are well-known. The secondary and tertiary aminoalcohols of such origin herein included as raw materials or reactants for polymerization may therefore be expressed by the formula:

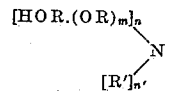

wherein OR is an alkylene oxide group having not more than 4 carbon atoms, and preferably is the ethylene oxide group. It may however be the propylene oxide, butylene oxide, glycid or methylglycid group. R' will be limited to a member of the class consisting of hydrogen atoms and alkyl radicals having less than 7 carbon atoms; $m$ represents a numeral varying from 0 to 3; $n$ represents the numeral 2 or 3; and $n'$ represents the numeral 0 or 1, with the proviso that $n+n'=3$. The various occurrences of OR may be of the same or of different alkylene oxide groups.

I prefer to use a tertiary amine containing three alkanol radicals. More specifically I prefer to use triethanolamine as a starting material; and I find the commercial product suitable, even though it contains an appreciable proportion of diethanolamine and a smaller proportion of monoethanolamine.

Since the temperatures commonly employed in the polymerization are of the order of 250° C., such materials as mono- and diethanolamine may be volatilized and lost before they can take part in any polymerization conducted at such temperatures. Anyway, I find no significant differences between the heat-polymers obtained from pure triethanolamine and commercial triethanolamine, for example.

The parent materials from which my reagents are prepared by oxyalkylation usually represent a trimeric, tetrameric, or higher state of polymerization, although the exact level is not clearly determinable. It may be estimated from the water loss, the increase in viscosity, or by a molecular weight determination. It will be assumed here that the existence of surface-activity means the polymerization has proceeded at least to about the trimeric state and probably to the tetrameric state.

When manufactured in iron vessels, the polymerized alkanolamines are deep-amber-colored to dark-brown products.

The polymerization of the basic hydroxyamino starting material is readily effected by heating to about 200–270° C., especially in the presence of alkaline catalysts such as sodium hydroxide, etc., of the kind commonly employed in the production of super-glycerinated fats. The catalyst proportion may range from a trace to 0.1% or 1% or even more in some cases. The water evolved is permitted to escape. Volatile constituents may be condensed and returned to the vessel if desired, after removal of the concomitant water, e. g., by distillation with xylene and subsequent separation of the latter.

The properties of the polymerized product are influenced by the temperature of reaction, the time, the presence or absence of catalysts, as well as by the nature of the starting material itself.

Subsequent discussion is limited to the polymerized tertiary aminoalcohols, since this is the preferred type.

Excessive polymerization may result in the production of a rubbery mass, whose solubility is questionable. Such extreme products are suitable for preparing the present reagents if they are susceptible to oxyalkylation to produce a solvent-dispersible end product.

Suitable amino starting materials, in addition to those already recited, include propylpropanolamine, cyclohexyldiethanolamine, cyclohexyldipropanolamine, etc. Other well-known amines which may be employed as starting materials or intermediates in the preparation of my reagents are the following:

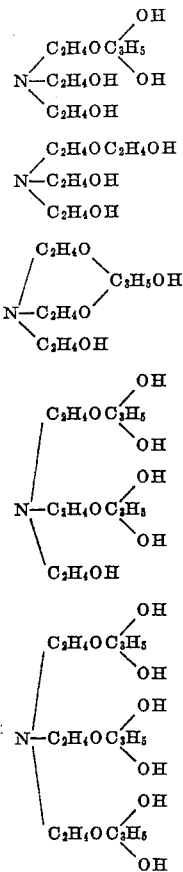

(See U. S. Patent No. 2,290,415, dated July 21, 1942, to De Groote.)

*Example 1*

Heat commercial triethanolamine in the presence of 1% of caustic soda, at a temperature of 245–260° C., for 4 hours.

*Example 2*

Heat commercial triethanolamine in an iron pot for 6 hours at about 250° C. The amine polymerizes and the viscosity increases, even though no catalyst is added.

*Example 3*

Extend the heating period of Example 2 to about 12–16 hours. After this time, the polymer is extremely viscous, and is apparently almost at the point of going to rubber.

*Example 4*

Substitute triisopropanolamine for triethanolamine in Examples 1–3 above. The heating time is required to be extended at least 50 to 100% to achieve comparable levels of polymerization.

*Example 5*

Polyethanolamine of the following formula:

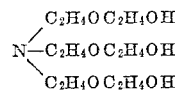

or

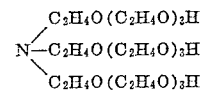

is substituted for triethanolamine in Examples 1–3.

My preference is to employ commercial triethanolamine, an iron processing vessel equipped with stirrer, a temperature of about 230–260° C., and a reaction time sufficient to produce a very viscous polymer, only slightly short of rubbery consistency. The reaction time cannot be exactly stated, because commercial triethanolamine varies slightly in its content of lower ethanolamines; and such variation affects the time required to reach any desired level of polymerization as judged, for example, by viscosity increase.

Another very desirable class of parent material for preparing my reagents is the polymerized alkanolamine mass resulting from the production of commercial alkanolamines. When the ethanolamines or the propanolamines are manufactured, still bottoms accumulate which comprise essentially polymerized ethanolamines or polymerized propanolamines. The composition of these still residues is naturally not well-defined. It is known they include, for example, triethanolamine or tripropanolamine, depending on the manufacturing operation which produced them; but the polymers present are not of definite and established composition. This is inconsequential, in that such still residues are available on the open market and are in commercial use for various purposes, today. Carbide & Carbon Chemical Corp. offers ethanolamine residues under the designation "Amine Residue T." Dow Chemical Co. uses the designation "Alkanolamine SB" to refer to similar materials of their manufacture.

Such residues have been described elsewhere as follows:

"By reacting the alkylene oxides, e. g., ethylene, isopropylene, and isobutylene oxides with ammonia primary, secondary and tertiary alkylolamines are the principal products formed. These reactions are exothermic and an operating temperature of 50 degrees C. to 60 degrees C. is usually satisfactory. If technical 28% aqueous ammonia is employed, primary, secondary and tertiary amines are obtained in varying proportions, dependent entirely on the alkylene oxide-ammonia ratio. In rectification of the reaction mixture the various amines are separated by distillation. The tertiary alkylolamine, being the highest boiling member, comes over last. In commercial operations there is a gradual accumulation of still bottoms or still residues consisting of materials having boiling points above 280 degrees C. at atmospheric pressure and considerably in excess of the corresponding tertiary alkylolamine. There is no authentic information as to the constitution of these residues.

"The preferred alkylene oxide-ammonia residue is derived from the manufacture of commercial triethanolamine from ethylene oxide and ammonia. The material is a dark, very viscous, hygroscopic liquid which boils above 244 degrees C. at 50 mm.

"The manufacture of the following primary, secondary and tertiary alkylolamines from alkylene oxides and ammonia results in the formation of still residues which would be suitable starting materials for the purpose of the invention: diethanolamine, octylethanolamine, cyclohexylethanolamine, dipropanolamine, propylpropanolamine, benzylethanolamine, propyldiethanolamine, tripropanolamine, methyldipropanolamine, cyclohexyldiethanolamine, ethyldicyclohexanolamine, trihexanolamine, 2-amino-2-methyl-2-propanol, octadecyldiethanolamine and polyethanolamine."

Such alkanolamine residues and mixtures thereof may be used directly to produce my reagents or they may be further polymerized by heating at temperatures comparable to those employed above in connection with commercial triethanolamine, before being so used. I prefer to employ them as purchased, and without further heat-processing before oxyalkylation. In some foam-inhibiting applications, oxyalkylated derivatives prepared from such residues or still bottoms are superior in effectiveness to the comparable derivatives prepared from polymerized commercial triethanolamine. The oxyalkylated derivatives of unpolymerized commercial triethanolamine are of little value as anti-foamers, so far as I have examined them.

Having prepared the polymerized parent aminoalcohol, I prepare my reagent by oxyalkylating it.

Oxyalkylation is a conventionally employed process today, and need not be described in detail. It is sufficient to say that if a compound contains a hydrogen atom attached to oxygen, nitrogen, or sulfur it is ordinarily susceptible to reaction with an alkylene oxide selected from the class consisting of ethylene oxide, propylene oxide, butylene oxide, glycid, and methylglycid. In oxyalkylation, the oxide is absorbed and appears as one or more oxyalkylene groups between the labile hydrogen atom and the oxygen, nitrogen, or sulfur atom to which said hydrogen atom was originally attached. Long oxyalkylene group chains may therefore be readily introduced into oxyalkylation-susceptible compounds in this manner. The oxyalkylation process is facilitated by the presence of an alkaline catalyst, but where the initial reactant is basic the catalyst's importance is minimized. It is possible to achieve many oxyalkylations under such circumstances without any catalyst being present.

U. S. Patent No. 2,499,365, dated March 7, 1950, to De Groote and Keiser, gives an exhaustive statement of oxyalkylation, its reactants, and procedures. While the oxyalkylation-susceptible reactants there involved were synthetic resins, the statements made there are broadly relevant here, and reference is made to them.

Oxyalkylations may be conducted at quite different temperatures. The lower temperature limit, of course, is the temperature which just barely sustains reaction and absorption of the alkylene oxide. Higher temperatures produce greater reaction rates, until dangerously rapid, exothermic reactions are observed, especially with a reactant like glycid. Ordinarily, there is no appreciable difference in the oxyalkylated products when different temperatures are employed in the oxyalkylation. I have found, however, that sometimes it is definitely desirable to conduct the oxyalkylation step at a lower temperature and for a longer time than at a higher tempearture for a shorter time. More rarely, the opposite holds true. All such variations lie within the scope of my invention.

While the oxyalkylation may be conducted using any alkylene oxide selected from the class consisting of ethylene oxide, propylene oxide, butylene oxide, glycid, and methylglycid, I employ principally ethylene oxide and propylene oxide in producing my reagents. More particularly, I employ propylene oxide in preference to ethylene oxide. In preparing my preferred reagents, I employ sufficient propylene oxide that at least one-half of the finished oxyalkylated product consists of the oxypropylene group, $OC_3H_6$. Where ethylene oxide is used in addition to propylene oxide, the products sometimes show an enhanced effectiveness. Where both ethylene oxide and propylene oxide are used, I generally prefer to introduce the propylene oxide first, and the ethylene oxide subsequently, although I do not limit myself to this order of procedure.

My invention is therefore a process for inhibiting foam, characterized by subjecting a foaming composition to the action of an oxyalkylated derivative of a surface-active, heat-polymerized aminoalcohol of the formula

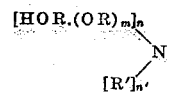

wherein the various terms have the meanings above applied to them, oxyalkylation being accomplished by means of an alkylene oxide selected from the class of ethylene oxide, propylene oxide, butylene oxide, glycid, and methylglycid.

The polymerized aminoalcohol products prepared according to any of the examples recited above, including the preferred examples, may be oxyalkylated by a conventional procedure which is generally applicable. It is necessary therefore only to describe several preferred examples here.

The polymerized commercial triethanolamine, referred to above as a preferred parent material, 500 grams, is placed in an autoclave, equipped with the usual fittings, including a stirrer. The mass is heated to about 150° C. and 20 ml. of 48° Baumé sodium hydroxide are added. The temperature is held at 150° C. for 30 minutes, while venting the vessel with nitrogen. After the water of solution has been removed, the autoclave is sealed, and propylene oxide is introduced at about 105–115° C., with the stirrer running. Samples may be removed at different levels of propylene oxide, as desired. In one instance, I introduced a total of 1,300 ml. of propylene oxide, 1,500 ml., 1,900 ml., 2,300 ml., 2,900 ml., and 3,700 ml., successively.

Where ethylene oxide as well as propylene oxide is to be introduced, it is preferable to introduce it after the propylene oxide, simply by feeding the ethylene oxide into the autoclave containing the oxypropylated amino product. Oxyethylation is preferably conducted at about 160–170° C.

Where the starting amino material is an alkanolamine still bottom, the procedure is also preferably like that just described.

My present class of reagents may be used alone in foam inhibition, or they may be used in admixture with any other effective and compatible anti-foamer, e. g., with the reagents described and claimed in my U. S. Patent No. 2,408,527, dated October 1, 1946, those described and claimed in my co-pending application, Serial No. 775,145, filed September 19, 1947, now Patent 2,622,070, granted December 16, 1952, or those described and claimed in my co-pending application, Serial No. 180,691, filed August 21, 1950, now Patent 2,622,069, granted December 16, 1952.

It is usually convenient to dilute my reagents during manufacture or before use with some suitable solvent. Solvents generally suitable for incorporation into my reagent include: water; petroleum hydrocarbons, like gasoline, kerosene, stove oil, aromatic solvent; coal tar products, such as benzene, toluene, xylene, tar acid oil, cresol, anthracene oil; alcohols, particularly aliphatic alcohols like methyl, ethyl, isopropyl, butyl, hexyl, octyl, etc. Miscellaneous solvents, such as pine oil, carbon tetrachloride, etc., may be employed. Sometimes other factors such as whether it imparts an objectionable odor to the defoamed composition or to the products into which it finds its way will determine the choice of solvent. In general, the amounts of finished anti-foamer reagent employed are so small that considerable tolerance of undesirable properties in a solvent exists.

The mixture of active ingredients and solvents is stirred until homogeneous. I prefer to employ a petroleum distillate in the proportion of 25 to 50% of the finished product, by volume, although water is an excellent solvent in some instances.

I desire to point out that the superiority of the reagent contemplated in my process is based upon its ability to reduce or destroy foam, or to prevent foam formation, in certain foaming or potentially foaming compositions more advantageously and at lower cost than is possible with other reagents or processes. In certain instances, it has been found to destroy or reduce foams or prevent their formation, which foams were not economically or effectively reducible or preventable by any other known means.

My reagents are useful in controlling foams in many different types of system, aqueous and non-aqueous. They will control foams encountered in the manufacture of alkaline hypochlorite bleaches. They are effective in controlling foam in petroleum refining operations. They are effective in inhibiting foam in a gas-treating system, in which a mixture of glycols and alkanolamines is used to dehydrate and purify natural gas.

I have applied my reagents to the control of foam in protein adhesives solutions, such as casein and soybean adhesives, as used in the plywood industry. Latex adhesives, printing inks, aqueous emulsion paints, all produce foams which are amenable to my reagents.

In the foregoing description, I have made it clear that my reagents may be used to reduce, destroy, or prevent foam. In the appended claims I have used the word "inhibit" to include all these corrective and preventive aspects of my process and reagents.

The procedures employed in practising my process are numerous. The following description will illustrate several techniques commonly employed. It should be understood that the claims are not limited to the procedures described; and that my process consists broadly in bringing into contact by any suitable means my reagent and the foam or the potentially foaming composition.

In controlling foam in a glycol-amine gas treating plant handling natural gas, the glycol-amine mixture had a volume of about 2,000 gallons and make-up was about 2,000 gallons a month. My first preferred reagent was injected into the liquid mixture in the return line from the stripping operation, by means of an electrically-powered proportioning pump of conventional design. The feed rate was less than 1 quart daily. Foam difficulties in the system were satisfactorily controlled by this procedure.

In sewage plants, for example, in activated-sludge-process plants, foam is frequently a serious problem in aeration basins and elsewhere. In one such plant, I have demonstrated that my reagent will control foam when sprayed into the head of foam, or when sprayed into or simply poured into the liquid in such basin. The foam-inhibiting effect appears to persist quite satisfactorily.

Determination of the optimum or minimum amount of my foam-inhibiting reagent to be used in any application may be accomplished in different ways. Small portions of the potentially foaming liquid may be filled into test bottles, different small proportions of my reagent added, and the chemicalized samples shaken for a short time. Simple observation of the relative speed and completeness of foam destruction should permit selection of the best reagent proportion to be applied on the large scale. The easiest way to determine the amount of my reagent required is to introduce it into the foaming or potentially foaming liquid in a fairly large proportion, e. g., 1%, and then to reduce the reagent feed rate until foam destruction is just being accomplished satisfactorily. Usually foam destruction is directly proportional to the amount of reagent used, at least up to about 1% of reagent. In a few instances, it may be found that using more or less reagent than an optimum proportion will give inferior results.

If the proportions of reagent to be employed in the above test are very small, it may be desirable to determine the optimum proportions of foaming composition and anti-foamer by introducing the latter into the sample of foaming liquid in the form of a solution in a suitable solvent.

Throughout this specification, I have shown that my process is equally applicable to systems in which a foam is already in existence and to systems which are potentially foaming compositions, in that they have the property of producing foams when agitated or mixed with air or some other suitable gas. Destruction, reduction and prevention are substantially equivalent actions. It is impossible to determine whether the reagent does in fact prevent the formation of the initial laminae of foam or whether such initial laminae are destroyed by the reagent before subsequent laminae of sufficient stability to produce a foam can be superimposed thereon. By "foaming composition" in the appended claims, I mean a composition which is either actually foaming or which is capable of producing a foam under suitable conditions, e. g., by simply passing air through it.

In most instances, my reagent is effective to the extent that it destroys an existing foam substantially completely. In some instances, as when too little reagent is used, foam reduction may be slow or even incomplete. I intend that this description and my invention relate both to complete destruction and to partial destruction of foams.

The proportions of my reagent required to be employed appear to vary widely. However, I wish to limit my invention to the use of my reagent in amounts 1% or less of the foaming composition. Usually, the amounts required will be between 0.1% and 0.0001%.

I have stated above that my present reagents may be used in conjunction with any other effective and compatible anti-foamer. It should also be stated that they are useful in conjunction with foam-inhibiting processes which are mechanical or electrical in character, rather than chemical. For example, some foams may be effectively destroyed by water sprays or jets. Incorporation of a small proportion of my reagents into such water sprays increases their effectiveness. U. S. Patent No. 2,240,495, to Dillon et al., dated May 6, 1941, relates to a process for resolving foam by means of a high electrical potential. Incorporation of a small proportion of my present reagents into the foaming liquid increases the effectiveness of such electrical processes.

I claim:

1. A process for inhibiting foam, characterized by subjecting a non-detersive foaming composition to the action of not more than 1% of an oxyalkylated derivative of a surface-active, heat-polymerized aminoalcohol of the formula

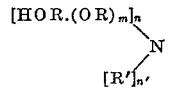

wherein OR is an alkylene oxide radical having not over 3 carbon atoms and selected from the class consisting of ethylene oxide and propylene oxide radicals; R' is a member of the class consisting of hydrogen atoms and alkyl radicals having less than 7 carbon atoms; $m$ represents a numeral varying from 0 to 3; $n$ represents a numeral from 2 to 3; and $n+n'=3$.

2. The process of claim 1, wherein the oxyalkylated derivative is at least in part an oxypropylated heat-polymerized aminoalcohol.

3. The process of claim 1, wherein the oxyalkylated derivative is an oxyalkylated heat-polymerized aminoalcohol, with the proviso that at least one-half of the oxyalkylated derivative molecule consist of a multiple of the oxypropylene group, $OC_3H_6$.

4. The process of claim 1, wherein the oxyalkylated derivative is both oxypropylated and oxyethylated.

5. The process of claim 1, wherein the oxyalkylated derivative is both oxypropylated and oxyethylated, with the proviso that at least one-half of the oxyalkylated derivative molecule consist of a multiple of the oxypropylene group, $OC_3H_6$.

6. The process of claim 1, wherein the oxyalkylated derivative is oxypropylated heat-polymerized triethanolamine.

7. The process of claim 1, wherein the oxyalkylated derivative is oxypropylated still bottoms from the manufacture of alkanolamines selected from the class consisting of ethanolamines and propanolamines.

8. The process of claim 1, wherein the oxyalkylated derivative is oxypropylated still bottoms from ethanolamine manufacture.

References Cited in the file of this patent

UNITED STATES PATENTS 2,407,895   Monson et al. _____ Sept. 17, 1946